W. QUINN.
Velocipede.
No. 159,770.
Patented Feb. 16, 1875.
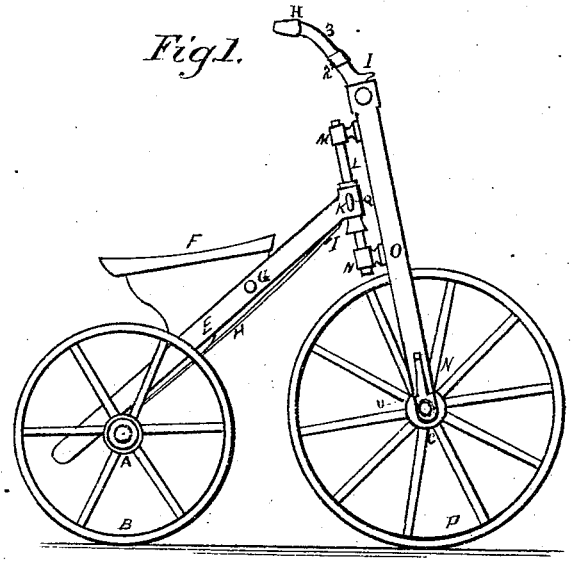
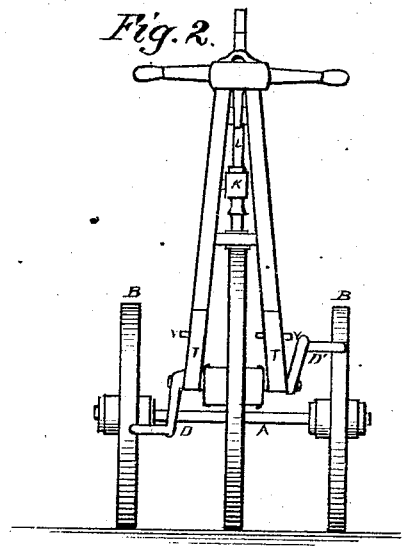
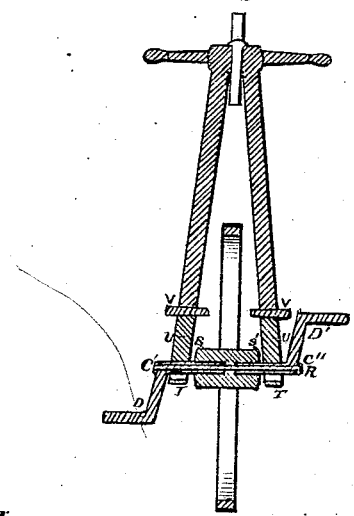
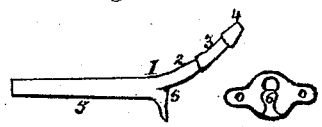
Witnesses:
Wm C. Head
W. Fasshauer.
Inventor:
Wm Quinn
by his Atty
Lloyd Wagner

UNITED STATES PATENT OFFICE.

WILLIAM QUINN, OF PHILADELPHIA, PENNSYLVANIA.

IMPROVEMENT IN VELOCIPEDES.

Specification forming part of Letters Patent No. 159,770, dated February 16, 1875; application filed June 15, 1874.

*To all whom it may concern:*

Be it known that I, WILLIAM QUINN, of the city and county of Philadelphia and State of Pennsylvania, have invented certain new and useful Improvements in Velocipedes; and I do hereby declare the following to be a full, clear, and exact description thereof, reference being made to the drawing annexed and the letters of reference marked thereon.

Figure 1 shows a side elevation; Fig. 2, a front elevation. Fig. 3 shows a section made in the plane indicated by line $x\,x$ in Fig. 1, and Fig. 4 shows a vertical section of the whistle.

The nature of my invention relates, first, to an arrangement of frame and seat for applying spring to the seat; second, an arrangement for adjusting the height of the seat, so as to adapt it to the length of the rider's legs; third, an improved mode of making the cranks and front axle and wheel-hub, and the bearing for the same; and, fourth, in an improved mode of making and applying an alarm-whistle.

A represents the back axle; B, the rear wheels; C, the front axle; D and D' the cranks for propelling the front wheel. E is the frame, having seat F jointed into it. Upon a joint, G, underneath the frame E, is secured a spring, H, made of one or more flat rods or plates fastened to the frame E at I, and with the other end resting upon the axle A, upon which it is free to slide, as the spring H shortens or lengthens by the seat F falling or rising thereon.

It will be seen on inspection of the part just described that the seat F always moves in the same direction on the spring H, and cannot vibrate sidewise.

The front end of the frame E has a casting, K, securely fixed upon it, with a vertical hole in it, through which passes a rod, L, at the upper and lower ends of which are attached the joints or bearing M and N, upon which is the frame O bearing the front wheel P and axle C. The casting K can be raised and lowered on the rod L, and held in any adjustment of height by a set-screw, Q, and the distance from the seat F to the axle C varied to suit the size of the rider. The axle C is formed of two parts, C' and C'', united by a bolt, R, passing through a tube formed therein. The two cranks D and D' are made in one piece with the parts C' and C'', preferably by casting, and have flanged cups S and S' formed on them, which, embracing the wooden hub of the wheel P, strengthen it, and render the axle C rigid and stiff, firmly bracing the parts C' and C'' to each other. The bearings in the frame O, in which the axle C turns, are each made with a strap, T, to hold the axle up, and with a block of hard wood or metal, U, for pressing the axle C down the block, this packed or forced down by wedge or liners V, and is held by lateral compression of the bolts W, which secure the straps to the frame O.

In this cheaply-constructed arrangement of parts wear can be readily compensated for.

The alarm-whistle is made in the following manner: A casting, 1, having a tube, 2, to which a flexible tube, 3, bearing a mouthpiece, 4, conveying air from the mouth of the rider, is secured by screws in the top of the frame O. Partly underneath the tube 2 is another tube, 5, closed at the lower end, which receives the jet of air from the tube 2, discharges it through the opening 6 in the casting 1, thus producing a shrill whistling sound analogous to that made by whistling into a key-barrel.

What I claim as my invention, and desire to secure as such by Letters Patent, is—

1. The combination of the frame E, seat F, and spring H, as and for the purpose set forth.

2. The combination of the frame E, vertically-adjustable slide K, and rod L, as set forth.

3. The crank-shaft C, formed of the two tubular crank-shafts provided with cupped flanges, and united by the bolt R, holding them in position on the wheel-hub P, all combined as set forth.

4. The bearings for the front axle, formed of the straps T, blocks U, and wedges V, and bolts W, all combined as and for the purpose set forth.

5. The whistle formed of the casting 1 and tube 5, formed and combined with the crossbar of the frame O, as and for the purpose set forth.

WILLIAM QUINN.

Witnesses:
J. M. HURTT,
JOHN B. DEVINE.